United States Patent Office.

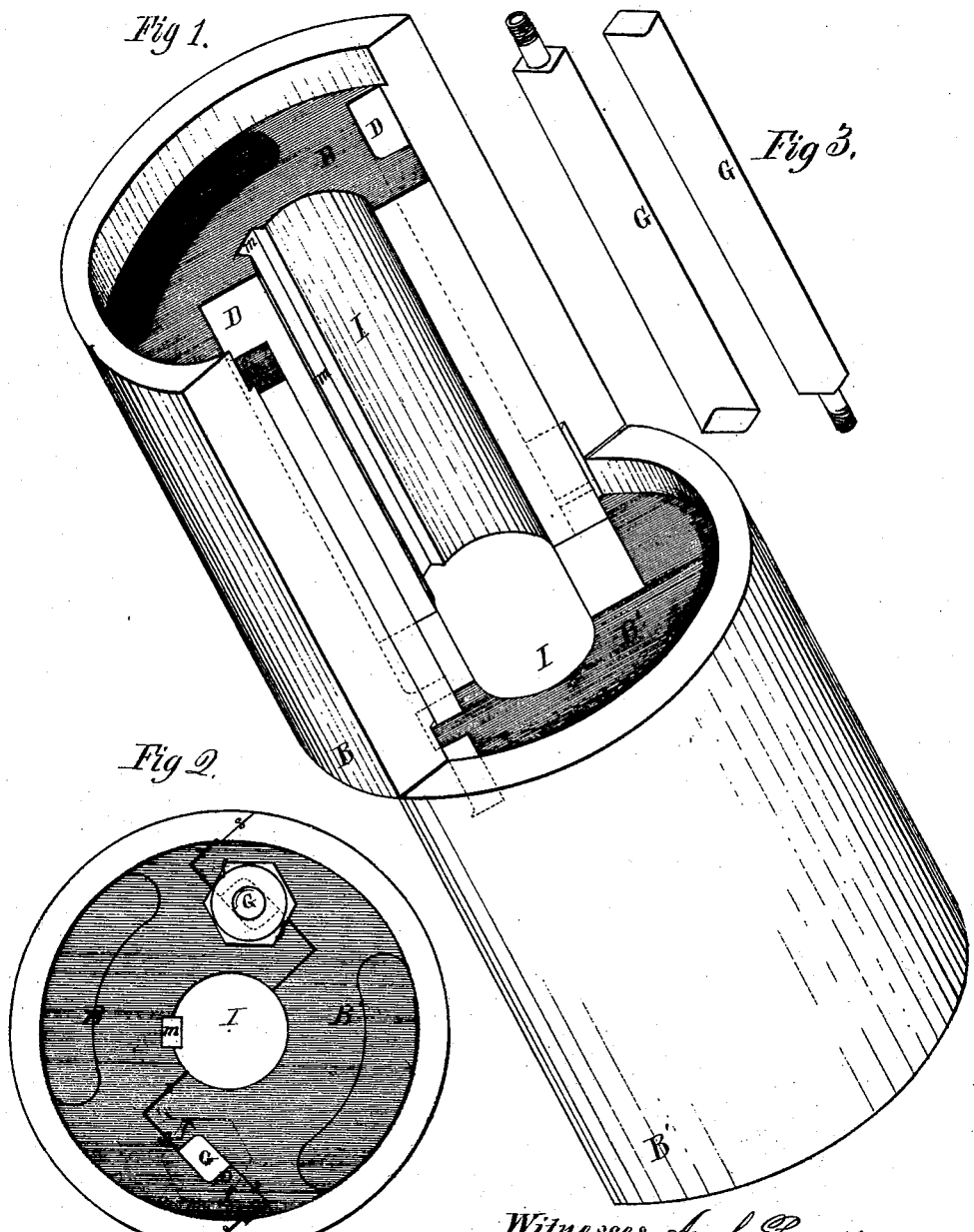

CHARLES BEAN, OF PROVIDENCE, RHODE ISLAND, ASSIGNOR TO ALBERT F. ALLEN, OF SAME PLACE.

Letters Patent No. 110,422, dated December 27, 1870.

IMPROVEMENT IN COUPLINGS FOR SHAFTING.

The Schedule referred to in these Letters Patent and making part of the same.

*To all whom it may concern:*

Be it known that I, CHARLES BEAN, of the city and county of Providence and State of Rhode Island, have invented a new and improved Coupling for Shafting; and I do hereby declare that the following is a full, clear, and exact description of the same, reference being had to the accompanying drawing making part of this specification, in which—

Figure 1 is a perspective view of my said coupling, showing the two halves separated;

Figure 2 is an end view of the same locked together upon the shaft; and

Figure 3 is a perspective view of the two keys by which the locking of the coupling is accomplished.

Similar letters of reference indicate like parts in all the figures.

My invention consists of a metallic sleeve formed in two halves, which are united upon the two ends of shafting by an angular joint so devised that, by means of two keys consisting of rectangular tapering pieces of metal, which are driven into two correspondingly-shaped apertures extending lengthwise of the said sleeve between two angles of said joint, the whole is locked securely together upon the shaft.

In the drawing—

B B' are the two halves of the sleeve, with a cylindrical hole, I, through the center, for the reception of the two ends of the shafts to be coupled, and provided with a key-seat or spline, *m*, for the key, which prevents the coupling from turning on the shaft.

The two halves of the coupling are united in an angular joint, *s*, extending in a zig-zag course through its center.

In connection with which construction the tapering apertures D D are formed, in which are fitted two tapering keys, G G, which, on being driven from opposite ends of the coupling snugly into the said apertures, exert a pressure between the surfaces of the projecting lips *f f*, and by so doing not only prevent the two parts of the coupling from being separated, but cause the same to gripe the shaft forcibly and to unite the two halves with such accuracy and exactness that the coupling will always preserve the same relation to the shaft, no matter how frequently it may be removed and replaced, the surface of the coupling always turning true and in line with the shaft.

The keys, after they are properly set up, are secured from loosening by means of a nut, *d*, screwed upon the smaller end of each, which protrudes from the coupling.

Besides its use for coupling shafting-sleeves, forming the hubs of pulleys, and gears of like construction, and secured in like manner, it may be used where it is difficult to remove the shaft for the purpose of putting on such pulley, or gear, or other device for delivering motion and power from such a shaft.

Having described my invention,

What I claim, and desire to secure by Letters Patent, is—

A shaft-coupling or sleeve constructed in two longitudinal parts, united by an angular joint parallel with the shaft, and secured by tapering keys, substantially as shown and described.

In testimony whereof I have hereunto subscribed my name this 27th day of February, A. D. 1869.

CHARLES BEAN.

Witnesses:
ISAAC A. BROWNELL,
WILLIAM BROWNELL.